United States Patent
Merchant et al.

(10) Patent No.: US 9,183,370 B2
(45) Date of Patent: Nov. 10, 2015

(54) SYSTEM FOR AUTHENTICATING A USER TO A PORTABLE ELECTRONIC DEVICE USING AN AUTHENTICATION TOKEN TRANSMITTED TO A SMART CARD READER

(71) Applicant: Motorola Mobility LLC, Libertyville, IL (US)

(72) Inventors: Kashyap Krishnan Merchant, Santa Clara, CA (US); Xinjie Cai, San Jose, CA (US); Sanjiv K Maurya, Fremont, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 39 days.

(21) Appl. No.: 13/949,587

(22) Filed: Jul. 24, 2013

(65) Prior Publication Data
US 2013/0312091 A1   Nov. 21, 2013

Related U.S. Application Data

(62) Division of application No. 12/237,007, filed on Sep. 24, 2008, now Pat. No. 8,522,326.

(51) Int. Cl.
| | |
|---|---|
| *G06F 21/35* | (2013.01) |
| *G06F 21/34* | (2013.01) |
| *H04L 29/06* | (2006.01) |
| *H04W 12/06* | (2009.01) |
| *H04W 88/02* | (2009.01) |

(52) U.S. Cl.
CPC ............. *G06F 21/34* (2013.01); *G06F 21/35* (2013.01); *H04L 63/0853* (2013.01); *H04W 12/06* (2013.01); *H04W 88/02* (2013.01)

(58) Field of Classification Search
CPC ....................................................... G06F 21/35
USPC .............................................................. 713/185
See application file for complete search history.

(56) References Cited

U.S. PATENT DOCUMENTS

| | | | |
|---|---|---|---|
| 2004/0103325 | A1 | 5/2004 | Priebatsch |
| 2005/0152294 | A1* | 7/2005 | Yu et al. ................. 370/310 |
| 2006/0041746 | A1 | 2/2006 | Kirkup et al. |
| 2006/0213982 | A1 | 9/2006 | Cannon et al. |
| 2006/0231623 | A1* | 10/2006 | Brown et al. ............. 235/451 |
| 2006/0236126 | A1 | 10/2006 | Adams et al. |
| 2007/0167190 | A1 | 7/2007 | Moosavi et al. |
| 2008/0014984 | A1 | 1/2008 | Brown et al. |
| 2008/0070501 | A1 | 3/2008 | Wyld |
| 2008/0072303 | A1 | 3/2008 | Syed |

* cited by examiner

Primary Examiner — Alexander Lagor
(74) Attorney, Agent, or Firm — Morris & Kamlay LLP

(57) ABSTRACT

A system includes a mobile unit and a smart card reader. The mobile unit includes a security application that prevents access to functionalities and data stored thereon and further includes an authentication application that securely stores an authentication token. The smart card reader communicatively connects to a smart card. The smart card includes authentication data. The authentication application transmits the authentication token to the smart card reader to verify the smart card. The authentication application shares the authentication token with the security application when the verification is successful. The authentication token indicates to the security application to grant access to the functionalities and the data.

6 Claims, 3 Drawing Sheets

SYSTEM FOR AUTHENTICATING A USER TO A PORTABLE ELECTRONIC DEVICE USING AN AUTHENTICATION TOKEN TRANSMITTED TO A SMART CARD READER

PRIORITY CLAIM

This application is a divisional of U.S. patent application Ser. No. 12/237,700 entitled "System and Method for Authenticating a Smart Card using an Authentication Token Transmitted to a Smart Card Reader" filed Sep. 24, 2008 by Kashyap Merchant et al., which claims priority from U.S. Provisional Appln. No. 61/057,676 entitled "System and Method for Authentication" filed May 30, 2008 by Kashyap Merchant at al. The specifications of the above-identified applications are incorporated herewith by reference.

BACKGROUND INFORMATION

A security arrangement for a mobile unit may provide access to the mobile unit for authorized users. The security arrangement may be in a variety of forms. For example, a smart card may be used. The smart card may include data relating to the user. Initially, a smart card reader is connected to the mobile unit so that when the smart card reader exchanges data with the smart card, authentication data may be transmitted to a mobile unit. Subsequently, a personal identification such as a PIN that is associated with the smart card may be entered to authenticate the user. However, the use of the smart card does not have a unified approach as an authentication process is required for various functionalities to be accessed on the mobile unit. Furthermore, a wireless connectivity between the reader and the mobile unit is prevented until authenticated using a further authentication process, thereby requiring a cable to connect the reader to the mobile unit.

DETAILED DESCRIPTION

Figure 1:
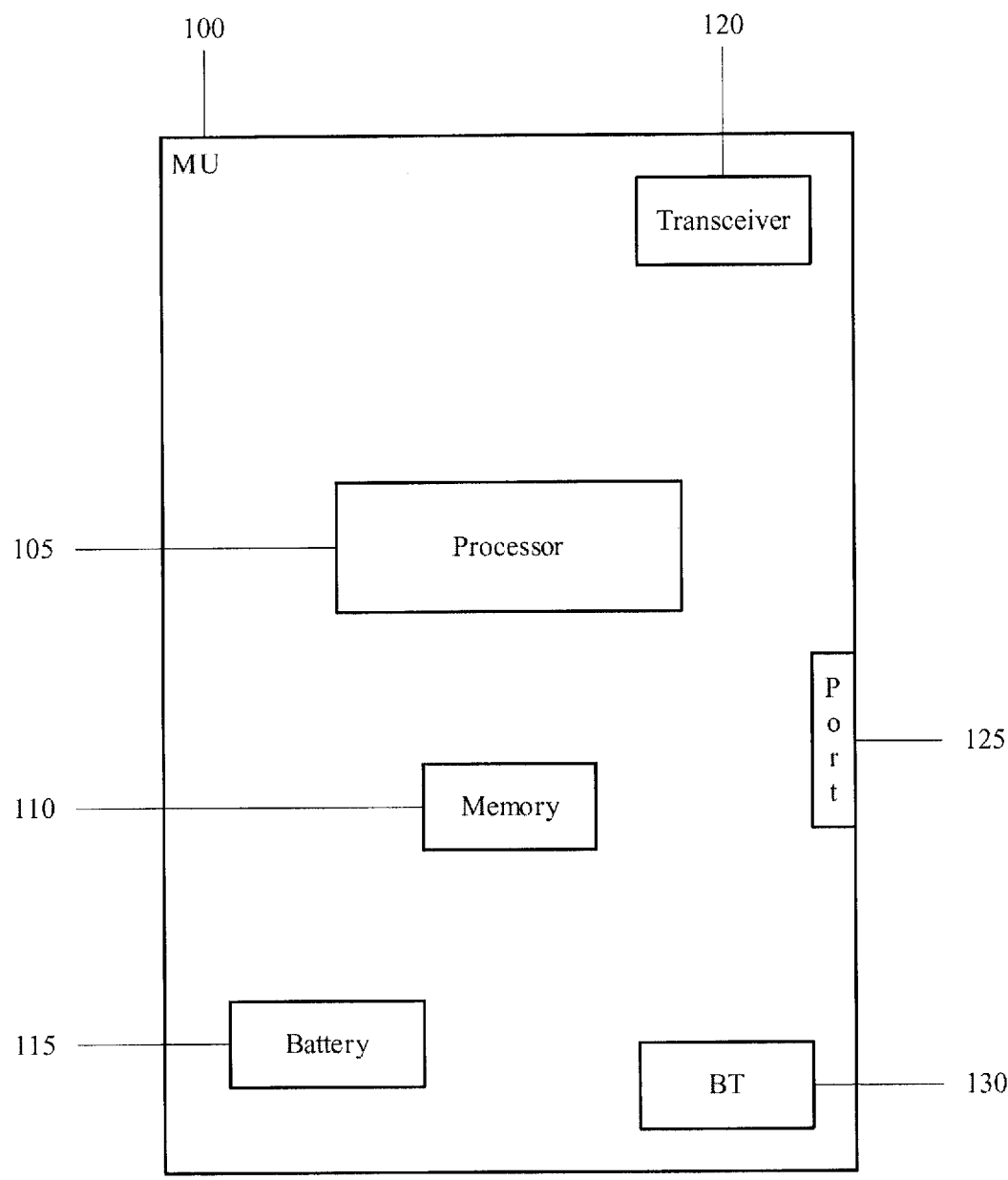
FIG. 1 shows a mobile unit according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for a unified approach of authentication for a mobile unit (MU) using a smart card (SC). According to the exemplary embodiments of the present invention, for each session, an authentication application performs a one-time authentication 2 that enables further functionalities that require the authentication. An authentication token may be stored with the authentication application as part of a verification process. The smart card, the authentication application, the authentication token, and an associated method will be discussed in more detail below.

FIG. 1 shows a MU 100 according to an exemplary embodiment of the present invention. The MU 140 may be any portable electronic device such as a mobile computer, a personal digital assistant (PDA), a laptop, an RFID reader, a scanner, an image capturing device, a pager, etc. The exemplary embodiments of the present invention illustrate authenticating a user for granting of access to the MU 100. However, it should be noted that the exemplary embodiments of the present invention may be applied to any computing device such as stationary ones (e.g., desktop computer). The MU 100 may include a processor 105, a memory 110, a battery 115, ~transceiver 120, a MU port 125, and a Bluetooth transceiver 130.

The processor 105 may be configured to be responsible for the operations and functionalities of the MU 100. The processor 105 may execute the authentication application. The MU 100 may further be configured with a security application. The security application may prevent access to functionalities and data of the MU 100 until an authentication procedure is performed. The security application may be executed by the processor 105. It should be noted that functionalities that are authenticated prior to use may include a respective security application. These security applications may also be executed by the processor 105. The memory 110 may be a storage unit for the MU 100. The memory 110 may store the authentication application, the security application, and respective related data such as an association between a smart card (SC) authentication token and a SC. The battery 115 provides a power supply to the MU 100. The battery 115 may be rechargeable. The transceiver 120 may enable wireless signals to be exchanged (e.g., transmitted and/or received). The transceiver 120 may also enable the MU 100 to be communicatively connected to a network. The transceiver 120 may transmit and/or receive signals via an antenna (not shown).

The port 125 may receive a first end of a wired arrangement. For example, the first end may be a universal serial bus (USB) jack. The processor 105 may determine a peripheral device based on a type of USB jack, initial data received via the USB jack, etc. using known methods. The processor 105 may proceed accordingly depending on the type of the peripheral device. The Bluetooth transceiver 130 may be substantially similar to the transceiver 120. However, the Bluetooth transceiver 130 may be used for a short range wireless communication, such as with a peripheral device.

Figure 2:
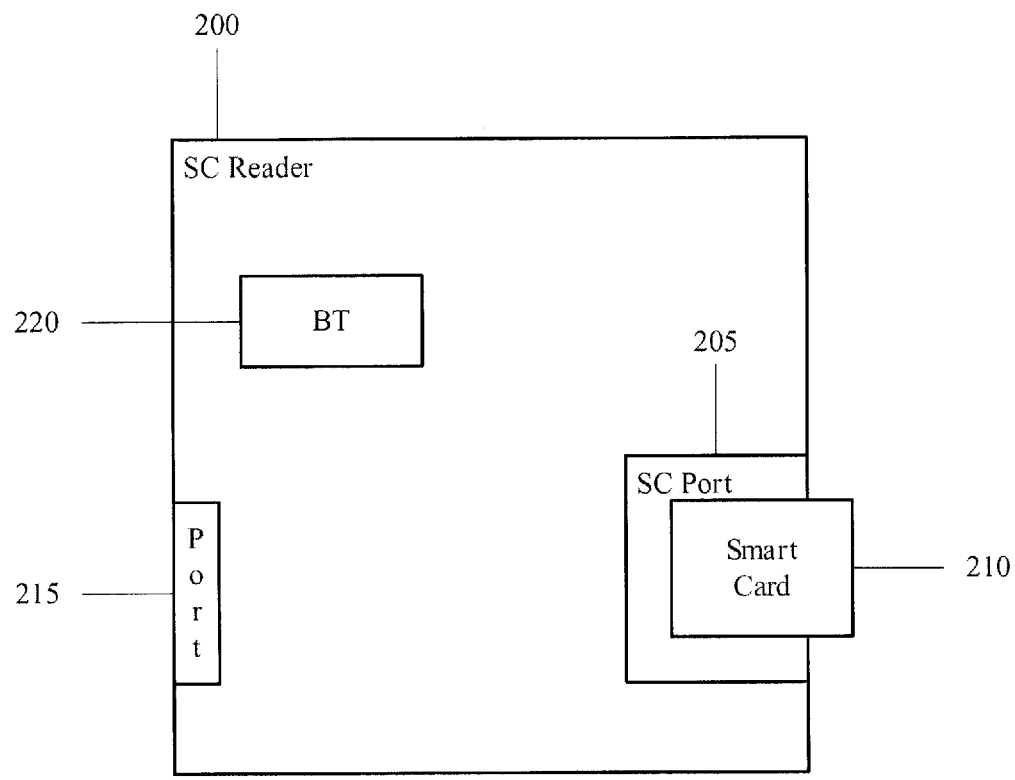
FIG. 2 shows a smart card reader according to an exemplary embodiment of the present invention.

FIG. 2 shows a SC reader 200 according to an exemplary embodiment of the present invention. The SC reader 200 may be a peripheral device that connects to the MU 100 of FIG. 1. The SC reader 200 may include a SC port 205, a reader port 215, and a reader Bluetooth transceiver 220.

The SC reader 200 may be configured to exchange and/or read data with a SC 210. In a first exemplary embodiment, as illustrated in FIG. 2, the SC reader 200 may receive the SC 210 in the SC port 205. The SC port 205 may include a plurality of contacts that couple to a plurality of corresponding contacts of the SC 210. Those skilled in the art will understand that the SC 210 may be a contact SC with a contact area that includes the plurality of corresponding contacts. In a second exemplary embodiment, the SC reader 200 may communicatively couple to the SC 210. The SC port 205 may be a reading component that exchanges data with a tag of the SC 210. Those skilled in the art will understand that the SC 210 may be a contactless SC that utilizes, for example, radio frequency identification (RFID) technology. Accordingly, the SC port 205 may include a RFID reader.

The reader port 215 may be substantially similar to the port 125 of the MU 100. Specifically, the reader port 215 may receive a second end of the wired arrangement. Because the SC reader 200 is a peripheral device, the reader port 215 may not require an intelligence arrangement similar to the MU 100 that recognizes a device receiving the first end of the wired arrangement. The reader Bluetooth transceiver 220 may be substantially similar to the Bluetooth transceiver 130 of the MU 100. Specifically, according to the exemplary embodiments of the present invention, when enabled, the Bluetooth transceiver 130 may be wirelessly communicating with the reader Bluetooth transceiver 130.

According to the exemplary embodiments of the present invention, the authentication application of the MU 100 may be a secure application that prevents sharing of data related thereto until required. That is, data designated with the authentication application may be inaccessible unless otherwise instructed. An initial process of the authentication application may be to present a prompt to a user with the SC 210. The user may enter an authentication token such as a personal identification number (PIN). The authentication token may be stored in the memory 110 or on a dedicated memory for the authentication application.

When the SC 210 is communicatively connected (e.g., received, wirelessly communicating, etc.) to the SC reader 200, the SC reader 200 may be connected to the MU 100 via the reader port 215 and the port 125 using the wired arrangement such as a cable. At this point of the authentication procedure, the Bluetooth transceiver 130 may be prevented from wirelessly communicating with the reader Bluetooth transceiver 220. In particular, during an initial connection between the MU 100 and the SC reader 200, confidential data may be transmitted therebetween. To prevent eavesdropping, the Bluetooth transceivers may be prevented from the wireless communication. In addition, the security application of the MU 100 may prevent use of the functionalities including those provided by the Bluetooth transceiver 120. Thus, the wired arrangement may be required. Furthermore, those skilled in the art will understand that the wired arrangement enables an automatic exchange of data without requiring a further process such as activating appropriate components.

As discussed above, when the MU 100 receives the wired arrangement via the port 125, the processor 105 may determine that the peripheral device connected to the second end of the wired arrangement is the SC reader 200. The processor 105 may be configured to initiate the authentication application. The authentication application may query the SC reader 200. The query may include transmitting the stored authentication token (e.g., PIN) to the SC reader 200. The SC reader 200 that is already communicatively connected to the SC 210 may use authentication data stored on the SC 210 to verify the authentication token. The SC reader 200 may reply to the query by transmitting a signal indicating a success or a failure of the verification.

Once verified, the authentication application may indicate to the processor 105 that the SC reader 200 is to be paired with the MU 100. In a preferred exemplary embodiment, the processor 105 may enable the Bluetooth transceiver 130 to wirelessly communicate with the reader Bluetooth transceiver 220, thereby eliminating a need for the wired arrangement. Upon verification, the authentication application may further be configured to share the authentication token with the security application. When the security application receives the authentication token, the authentication procedure usually involving the communicative connection with the SC 210 and the entering of an identifier such as the PIN is completed. Thus, the security application may enable use of the functionalities of the MU 100 and access to the data stored in the memory 110. Furthermore, functionalities that require the authentication procedure may be enabled through the one-time process.

It should be noted that the security application may not enable use of every functionality of the MU 100 nor access to all data stored in the memory 110. The security application of the MU 100 may include parameters for each user. Thus, the security application may determine the accessible functionalities and data for the individual user. The security application may also prevent accessibility to other functionalities and data that the user is prevented from using/viewing. In addition, the security application may determine settings for the user such as display, an arrangement of icons on the display, etc. and load these settings. Furthermore, every functionality that requires the authentication procedure may not be enabled. Similar to the security application granting access, only selected functionalities that require the authentication procedure may be enabled as a function of the authentication data on the SC 210 relating to the user.

It should also be noted that the use of BT is only exemplary. As discussed above, the MU 100 and the SC reader 200 may include BT transceiver 130 and the reader BT transceiver 220, respectively. However, the MU 100 and the SC reader 200 may be any type of wireless transceiver device. In particular, the wireless transceiver device may be for a short range.

Figure 3:
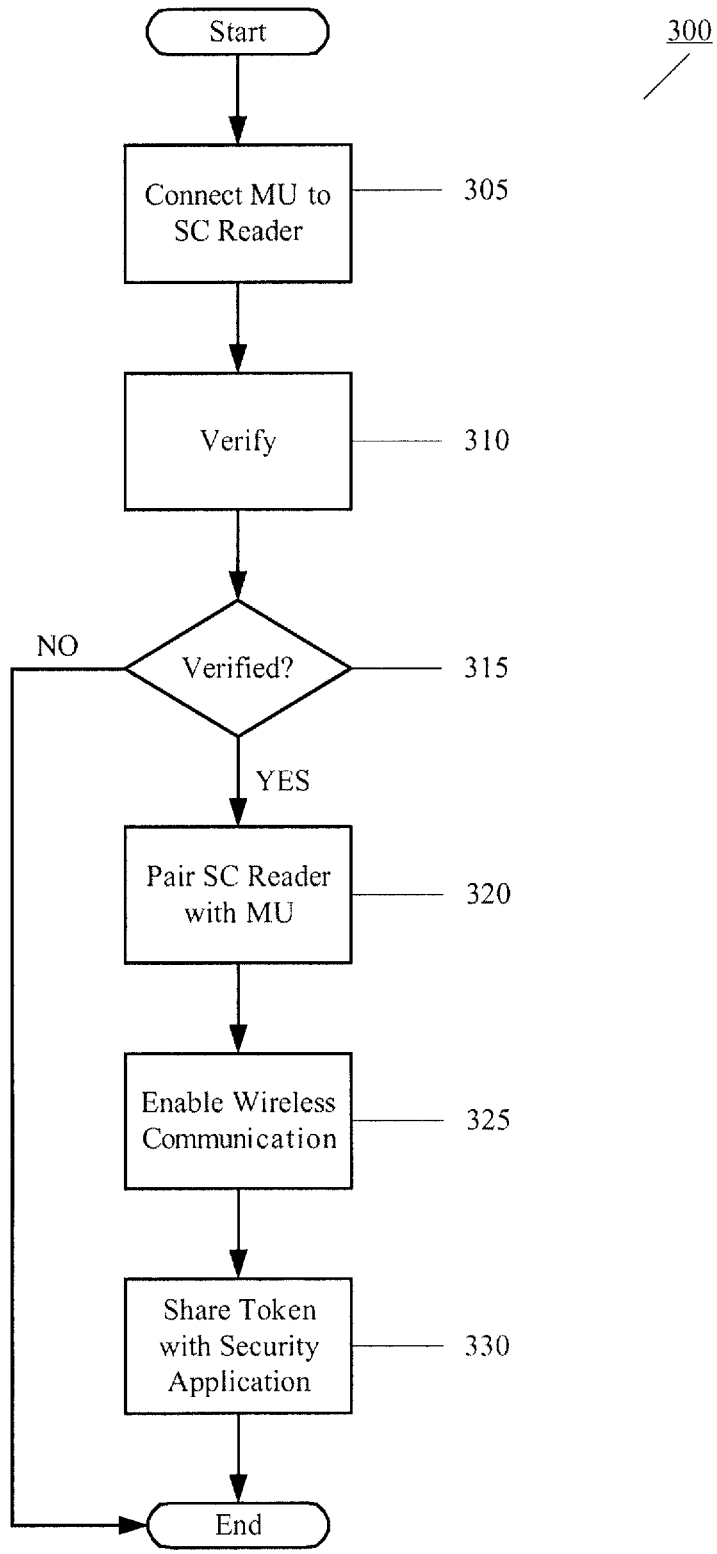
FIG. 3 shows a method for authentication according to an exemplary embodiment of the present invention.

FIG. 3 shows a method 300 for authentication according to an exemplary embodiment of the present invention. The method 300 relates to the authentication procedure where a SC is used. The method 300 will be described with reference to the MU 100 of FIG. 1 and the SC reader 200 of FIG. 2. However, it should be noted that the use of the MU 100 is only exemplary and the method 300 may apply an authentication for any computing device that is capable of connecting to the SC reader 200.

It should be noted that the method 300 assumes that the initial steps for setting up the authentication procedure have already been performed. Specifically, the initial steps may include installing the authentication application on the MU 100. The authentication application may prompt for each user to enter the authentication token. The association between the user and the respective authentication token may be stored. It should also be noted that the method 300 assumes that the SC 210 is available and communicatively connected to the SC reader 200. The method 300 may include a preliminary step that determines whether the SC 210 is available. In a scenario where the SC 210 is unavailable, an error message may be displayed or the method 300 may end.

In step 305, the MU 100 is connected to the SC reader 200. As discussed above, the MU 100 may be connected to the SC reader 200 through a wired arrangement via the port 125 and the reader port 215, respectively. The security application of the MU 100 may prevent use of functionalities available on the MU 100 such as use of other components including the Bluetooth transceiver 130. The connection of the SC reader 200 may indicate to the MU 100 that the peripheral device connected to the MU 100 is the SC reader 200. Once recognized, the processor 105 may initiate the authentication application (step not shown).

In step 310, a verification is performed. The authentication application may retrieve the authentication token that has already been entered, for example, when a setup wizard was initiated when the authentication application was installed, when a new user was entered, etc. The authentication token may be transmitted to the SC reader 200 via the wired arrangement as a query. The SC reader 200 may verify the authentication token with the authentication data of the SC 210. The SC reader 200 may reply to the query to indicate whether the authentication token corresponds to the SC 210.

In step 315, a determination is made by the authentication application whether the verification is successful. That is, the authentication token corresponds to the SC 210 that is communicatively connected to the SC reader 200. If the verification is unsuccessful, the method 300 may end. In a preferred embodiment, the method 300 may return to step 310 (not shown). A prompt may be shown to the user for the authentication token to be entered. This step may be repeated a predetermined number of times. If the predetermined number is exceeded, the authentication application may disable access to the SC 210. Accordingly, the user is prevented from accessing functionalities and data of the MU 100. If the verification is successful, the method 300 continues to step 320.

In step 320, the authentication application indicates that the SC reader 200 is to be paired with the MU 100. The pairing of the SC reader 200 to the MU 100 enables the use of the authentication data stored on the SC 210 to be available to the MU 100 and, therefore, the security application of the MU 100. As discussed above, in the preferred exemplary embodiment of the present invention, the pairing may include enabling the Bluetooth transceiver 130 to wirelessly communicate with the reader Bluetooth transceiver 220 (step 325). A subsequent step may include removing the wired arrangement.

In step 330, the authentication application shares the authentication token with the security application and functionalities that require the authentication token. When the authentication token is shared, the authentication procedure may be completed. The security application may enable access to the functionalities and data of the MU 100 to the user. The functionalities that require the authentication token may be enabled. The authentication data of the SC 210 may also be used to determine the types of functionalities, components, and/or data that the user is authorized to access.

The exemplary embodiments of the present invention enable a user to be authenticated with a MU using a SC. A onetime entering of an authentication token such as a PIN may provide a more efficient authentication procedure. Specifically, the use of the SC for authentication purposes entails a two-tiered process where the SC is read by the SC reader and the PIN is entered manually when prompted. By previously entering the authentication token in the authentication application (that is secure), the authentication token may be used as part of a verification with the SC when the MU is connected to the SC reader. The authentication application may be configured to share the authentication token with a security application of the MU to complete the second tier of the authentication procedure. The first tier may already be completed when the MU is connected to the SC reader as the SC reader is communicatively connected to the SC. The security application and functionalities that require the authentication token may be provided the authentication token. The onetime authentication of the user with the MU using the wired connection may enable the wired connection to be removed as a wireless communication between the MU and the SC reader may be established. Therefore, according to the exemplary embodiments of the present invention, the authentication procedure may be more efficient as all aspects including functionalities and data of the MU may be accessed from using the SC and connecting the SC reader to the MU.

Those skilled in the art will understand that the above described exemplary embodiments may be implemented in any number of manners, including, as a separate software module, as a combination of hardware and software, etc. For example, the 11 authentication application may be a program containing lines of code that, when compiled, may be executed on a processor 105 of the MU 100.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A system for authenticating a user to a computing device comprising:
   the computing device further comprising:
      a processor;
      a memory;
      a security application stored on the memory and when executed by the processor provides access to functionalities and data stored on the computing device only after receiving an authentication token, and
      an authentication application stored on the memory and when executed by the processor securely stores the authentication token; and
   a smart card reader, communicatively connecting to the computing device and to a smart card storing authentication data, to receive the authentication token from the authentication application via a wired connection and to verify the smart card using the authentication token,
   wherein the authentication application shares the authentication token with the security application only when the smart card reader successfully verifies the smart card and wherein the authentication application pairs the computing device to the smart card reader and subsequently activates a wireless communication protocol between the computing device and the smart card reader when the smart card reader successfully verifies the smart card.

2. The system of claim 1, wherein the wired connection is removed after the wireless communication protocol is activated.

3. The system of claim 1, wherein the smart card reader successfully verifies the smart card only when the authentication token corresponds to the authentication data.

4. The system of claim 1, wherein the security application prompts the user for a re-entry of the authentication token when the verifying is unsuccessful.

5. The system of claim 4 wherein the prompting is repeated until one of: the verifying being successful or the prompting is repeated a predetermined number of times.

6. The system of claim 1 wherein the authentication application receives the authentication token during at least one of: an activation of the computing device, an installation of the authentication application, or a manual entry of the authentication token.

* * * * *